(12) United States Patent
Dong et al.

(10) Patent No.: US 10,997,185 B2
(45) Date of Patent: May 4, 2021

(54) INFORMATION QUERY METHOD AND APPARATUS

(71) Applicant: Alibaba Group Holding Limited, Grand Cayman (KY)

(72) Inventors: Liang Dong, Guangdong (CN); Haifeng Jia, Guangdong (CN); Nengwei Hua, Guangdong (CN); Huachun Ma, Guangdong (CN); Canhui Ge, Guangdong (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 357 days.

(21) Appl. No.: 16/034,504

(22) Filed: Jul. 13, 2018

(65) Prior Publication Data
US 2019/0018849 A1   Jan. 17, 2019

(30) Foreign Application Priority Data

Jul. 14, 2017  (CN) .......................... 201710575327.5

(51) Int. Cl.
*G06F 16/2457* (2019.01)
*G06F 16/248* (2019.01)
*G06F 16/28* (2019.01)
*G06F 16/9535* (2019.01)
*G06F 16/2452* (2019.01)

(52) U.S. Cl.
CPC ...... *G06F 16/24578* (2019.01); *G06F 16/248* (2019.01); *G06F 16/2452* (2019.01); *G06F 16/288* (2019.01); *G06F 16/9535* (2019.01)

(58) Field of Classification Search
CPC .... G06F 16/9535; G06F 19/00; G06F 21/606; G06F 16/164; G06F 16/245; G06F 16/9536; G06F 3/04845; G06F 3/0482; G06F 12/1408; G06F 2212/1052; G06F 16/2455; G06F 16/24575; G06F 3/0481
USPC .......... 707/600–831, 899, 999.001–999.206
See application file for complete search history.

(56) References Cited

U.S. PATENT DOCUMENTS

| | | | | |
|---|---|---|---|---|
| 10,223,150 | B2* | 3/2019 | Livshits | G06F 11/2094 |
| 2005/0091074 | A1* | 4/2005 | Feldhahn | G06Q 99/00 |
| | | | | 705/65 |
| 2010/0088105 | A1* | 4/2010 | Feldhahn | G06Q 10/00 |
| | | | | 705/1.1 |
| 2013/0246261 | A1* | 9/2013 | Purves | G06Q 20/28 |
| | | | | 705/41 |

(Continued)

*Primary Examiner* — Angelica Ruiz
(74) *Attorney, Agent, or Firm* — Alston & Bird LLP

(57) ABSTRACT

Disclosed is an information query method and apparatus. The method includes: obtaining a query word input by a user through a terminal, identifying a target entity in the query word and determining a globally unique identifier (GUID) of the target entity for a knowledge map; determining a target entity type corresponding to the target entity according to a corresponding relationship between an entity and the entity type. The target entity type is used to indicate the target attribute and/or target entity relationship to be queried of the target entity; according to the GUID and an identifier of the target attribute and/or an identifier of the target entity relationship, querying an attribute value and/or a related entity corresponding to the identity of the target attribute and/or an identifier of the target entity relationship in the knowledge map; returning a search result to the terminal.

18 Claims, 7 Drawing Sheets

(56) References Cited

U.S. PATENT DOCUMENTS

2015/0220914 A1\* 8/2015 Purves ............... G06Q 30/0633
705/26.8

\* cited by examiner

Zhang San

Homepage  Introduction  Movie and TV works  Music works

Encyclopedia: ...

Related people

Spouse  Father  Partner  Friends

Personal information:
Date of birth: …
Spouse: …
Parents: …
Lover: …
Nationality: …
Friends: …
Partners: …

See more

INFORMATION QUERY METHOD AND APPARATUS

CROSS-REFERENCE TO RELATED APPLICATION

The present invention claims priority to and benefit of Chinese Patent Application No. 201710575327.5, filed with the State Intellectual Property Office (SIPO) of the People's Republic of China on Jul. 14, 2017 the entire content of which is incorporated by reference into the present application.

TECHNICAL FIELD

The present invention relates to the field of information search technology, and in particular, to an information query method and apparatus.

BACKGROUND ART

With the rapid development of information technology, today's society has entered an era of information explosion. More and more people are using the Internet to find the information they need.

At present, the use of search engines for information retrieval has become an important approach. For an existing search engine, after it receives a user's key words for search, feed back to the user the web page content, web page links, and so on related to the searched key words. However, the current search result page classification is not clear, and the recommended content is disordered, incomplete or inaccurate, so that a user cannot quickly obtain the useful information.

SUMMARY OF THE INVENTION

The embodiments of the present invention provides an information query method and apparatus, so as to overcome the problem that the search result page classification is not clear and the recommended content is disordered, incomplete or inaccurate.

In a first aspect, the present invention provides an information query method, which includes:

obtaining a query word input by a user through a terminal, identifying a target entity in the query word and determining a globally unique identifier (GUID) of the target entity for a knowledge map, wherein the GUID is used to distinguish different entities in the knowledge map, and the knowledge map comprises attributes and attribute values of the entities and relationships among the entities;

determining a target entity type corresponding to the target entity according to a corresponding relationship between an entity and an entity type, wherein the target entity type is used to indicate the target attribute and/or target entity relationship to be queried of the target entity;

according to the GUID and an identifier of the target attribute and/or an identifier of the target entity relationship, querying an attribute value and/or a related entity corresponding to the identity of the target attribute and/or an identifier of the target entity relationship in the knowledge map;

returning a search result to the terminal, so that the terminal displays the attribute value and/or related entity corresponding to the target entity to the user in the form of an entity detail card.

Optionally, the step of returning a search results to the terminal includes:

returning the search result to the terminal according to a priority of display order corresponding to each entity type; where, the entity type is divided into a significant type and a non-significant type, a display order of the significant type has a priority higher than a display order of the non-significant type, the position of the display order of the attribute value of the attribute and/or the related entity corresponding to the entity relationship indicated by an entity type of a higher priority in the entity detail card precedes the position of the display order of the attribute value of the attribute and/or the related entity corresponding to the entity relationship indicated by an entity type of a lower priority.

Optionally, the entity type is divided into a basic entity type and an extended entity type, the search result comprises the attribute value of the attribute and/or the related entity corresponding to the entity relationship indicated by a basic entity type, and an extended entity type; and a main interface of the entity detail card displays the attribute value of the attribute and/or the related entity corresponding to the entity relationship indicated by the basic entity type and an extended type tag;

the method further includes:

in response to an operation on the extended type tag made by the user on the terminal, returning to the terminal the attribute value of the attribute and/or the related entity corresponding to entity relationship indicated by the entity type corresponding to the extended type tag, so that the terminal displays the attribute value and/or related entity corresponding to the extended type tag on the main interface of the entity detail card.

Optionally, the entity detail card includes a head portion, a content area, and a trail portion;

the head portion is provided with an entity name corresponding to the entity and a significant feature of the entity;

the content area is provided with the attribute value of the attribute and/or the related entity corresponding to the entity relationship indicated by the entity type; and the tail portion is provided with a deployment option.

Optionally, the method further includes:

obtaining hot news corresponding to the entity, and the search result further comprises the hot news;

the content area is further provided with a news guide and a news link corresponding to the hot news.

Optionally, a preset number of entity information is set for each entity type in a non-deployed area in the content area, wherein the entity information is specifically an attribute of the entity and a corresponding attribute value, or an entity relationship and a corresponding related entity.

Optionally, the entity belongs to one of the following fields:

a field of people, a field of medicine, a field of book, a field of food, a food of plant, a field of real estate, a field of education and a field of entertainment.

In a second aspect, the present invention provides an information query apparatus, which includes:

an identifying module, which is used for obtaining a query word input by a user through a terminal, identifying a target entity in the query word and determining a globally unique identifier (GUID) of the target entity for a knowledge map, wherein the GUID is used to distinguish different entities in the knowledge map, and the knowledge map comprises attributes and attribute values of the entities and relationships among the entities;

a type determining module, which is used for determining a target entity type corresponding to the target entity according to a corresponding relationship between an entity and an entity type, wherein the target entity type is used to indicate the target attribute and/or target entity relationship to be queried of the target entity;

a querying module, which is used for querying an attribute value and/or a related entity corresponding to the identity of the target attribute and/or an identifier of the target entity relationship in the knowledge map according to the GUID and an identifier of the target attribute and/or an identifier of the target entity relationship; and a sending module, which is used for returning a search result to the terminal, so that the terminal displays the attribute value and/or related entity corresponding to the target entity to the user in the form of an entity detail card.

Optionally, the sending module specifically includes:

returning the search result to the terminal according to a priority of display order corresponding to each entity type;

where, the entity type is divided into a significant type and a non-significant type, a display order of the significant type has a priority higher than a display order of the non-significant type, the position of the display order of the attribute value of the attribute and/or the related entity corresponding to the entity relationship indicated by an entity type of a higher priority in the entity detail card precedes the position of the display order of the attribute value of the attribute and/or the related entity corresponding to the entity relationship indicated by an entity type of a lower priority.

Optionally, the entity type is divided into a basic entity type and an extended entity type, the search result includes the attribute value of the attribute and/or the related entity corresponding to the entity relationship indicated by a basic entity type, and an extended entity type; and a main interface of the entity detail card displays the attribute value of the attribute and/or the related entity corresponding to the entity relationship indicated by the basic entity type and an extended type tag;

the sending module is further used for:

in response to an operation on the extended type tag made by the user on the terminal, returning to the terminal the attribute value of the attribute and/or the related entity corresponding to entity relationship indicated by the entity type corresponding to the extended type tag, so that the terminal displays the attribute value and/or related entity corresponding to the extended type tag on the main interface of the entity detail card.

Optionally, the entity detail card includes a head portion, a content area, and a trail portion;

the head portion is provided with an entity name corresponding to the entity and a significant feature of the entity;

the content area is provided with the attribute value of the attribute and/or the related entity corresponding to the entity relationship indicated by the entity type; and the tail portion is provided with a deployment option.

Optionally, the querying module is further used for obtaining hot news corresponding to the entity, and the search result further comprises the hot news;

the content area is further provided with a news guide and a news link corresponding to the hot news.

Optionally, a preset number of entity information is set for each entity type in a non-deployed area in the content area, wherein the entity information is specifically an attribute of the entity and a corresponding attribute value, or an entity relationship and a corresponding related entity.

Optionally, the entity belongs to one of the following fields:

a field of people, a field of medicine, a field of book, a field of food, a food of plant, a field of real estate, a field of education and a field of entertainment.

According to the information query method and apparatus provided by the embodiments of the present invention, the method identifies the target entity in a query word after obtaining the query word, and then determines the GUID in the knowledge map for the target entity. According to the embodiments, when obtaining a search result for the target entity, according to the entity type corresponding to the entity, this method determines the target entity type to which the target entity belongs. The target entity type is used to indicate a target attribute to be queried and/or a target entity relationship of the target entity, and then the knowledge the data to be queried is obtained according to the GUID and the attribute identifier and entity relationship identifier knowledge map, that is, according to different entities with different corresponding entity types, the displayed contents will be different. In this way, the search results are categorized clearly. In addition, since the search result is obtained based on the knowledge map, so that the content corresponding to the search result has a clear structure, is complete and accurate, thereby allowing users to quickly obtain the useful information.

BRIEF DESCRIPTION OF DRAWINGS

In order to more clearly describe the technical solutions set forth in the embodiments of the present invention or the in the prior art, the drawings used in the description of the embodiments of the present invention or the prior art will be briefly described below. They are obviously some embodiments of the present invention. For a person of ordinary skill in the art, other drawings may also be obtained based on these drawings without any inventive skills.

DESCRIPTION OF THE EMBODIMENTS

To make the objections, technical solutions, and advantages of the embodiments of the present invention clear, the technical solutions set forth in the embodiments of the present invention will be further described clearly and completely in reference to the drawings of the respective embodiments of the present invention. Obviously, the embodiments described herein only a part of the embodiments of the present invention, rather than the entirety of the embodiments of the present invention. All other embodiments obtained by a person of ordinary skill in the art based on the embodiments of the present invention without inventive skills shall fall within the protection scope of the present invention.

Figure 1:
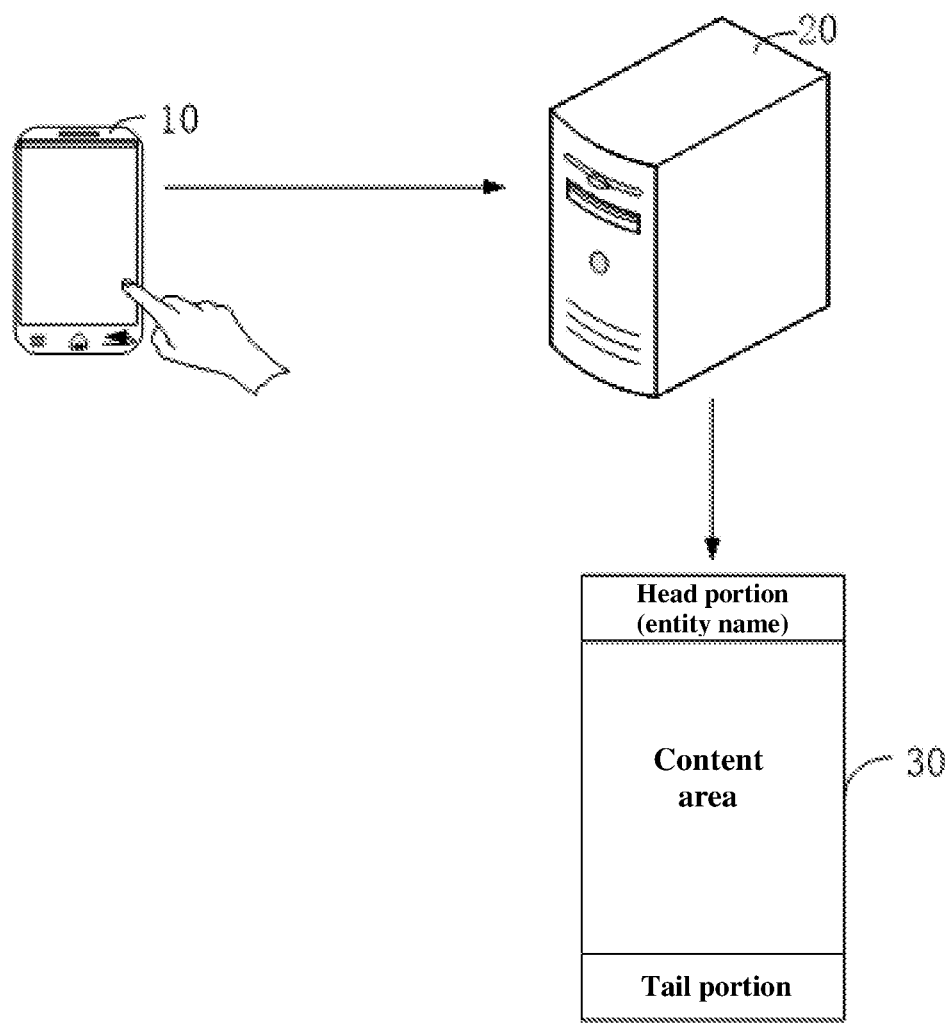
FIG. 1 is a schematic view of a scene of the information query provided by the present invention.

FIG. 1 is a schematic view of a scene of the information query provided by the present invention. As shown in FIG. 1, the terminal 10 can be a type of user equipment installed with a browser, such as a mobile phone, a computer, a tablet, and the like. After the user enters a query word on the browser, the browser sends a query request to a server 20; the server 20 identifies an entity within the query word, searches the knowledge map for the entity, and then returns a search result according to the importance of the attribute of the entity. The search result can be, for example, j son format data. The search engine combines j son data with a card template to render j son into html and css codes. Finally, the browser renders an entity detail card that can be seen by the user. The entity detail card is used to present to the user with the attribute value and/or related entity corresponding to the queried entity. A person of ordinary skill in the art can understand that, a data format of a search result is schematically shown herein, yet in a specific implementation process, other forms of data formats may also be adopted. The specific implementation manner of the data format in this embodiment is not limited.

Figure 2:
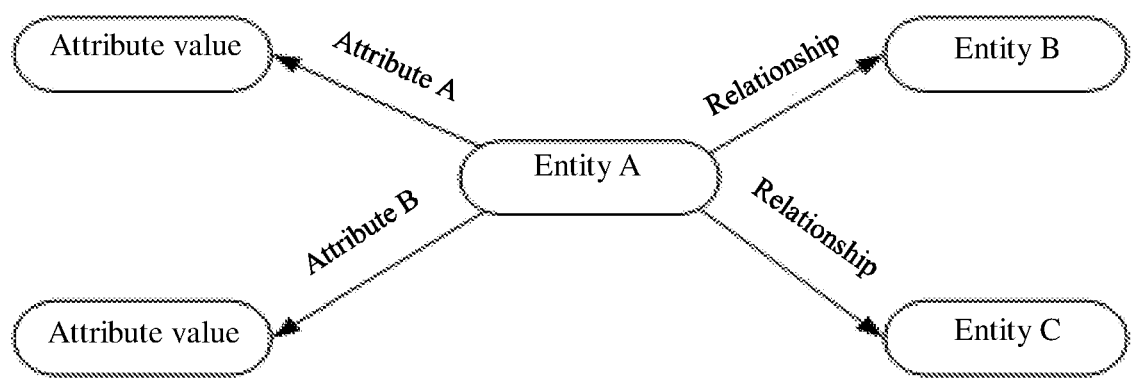
FIG. 2 is a schematic view of the structure of the knowledge map query provided by the present invention.

FIG. 2 is a schematic view of the structure of the knowledge map query provided by the present invention. A knowledge map is used to describe the various entities and relationships thereof existing in a real world. The knowledge map includes the attributes and attribute values of the entities and the relationships between the entities. A knowledge map can be viewed as a huge image, in which the nodes represent entities and the edges are formed by attributes or relationships. For example, the attributes and attribute values of entity A, as well as entity B and the entity C having relationships with the entity A are shown in FIG. 2.

In this embodiment, the knowledge map can be a general knowledge map, or may be the knowledge maps of a plurality of different fields. For the knowledge map, the entities can be in the fields such as people, medicine, book, food, plant, as well as real estate, education, and entertainment. The corresponding query methods are similar for different fields. In order to easily describe the embodiment of the present invention, a field of person is used as an example in the following description. As for other fields, they are very similar, so they will not be described in this embodiment.

An entity detail card is a virtual web page displayed on a terminal interface. This web page is the same or similar to the size of the terminal interface, which is similar to a card printed with important information. As shown in FIG. 1, in one possible way of implementation, the entity detail card includes a head portion, a content area, and a tail portion, in which the head portion is provided with an entity name corresponding to the entity, the content area is provided with the attribute value and/or the entity relationship obtained in a query, and the tail portion is provided with a deployment option.

In reference to FIGS. 1 and 2, the information query method provided in this embodiment will be further described in detail.

Figure 3:
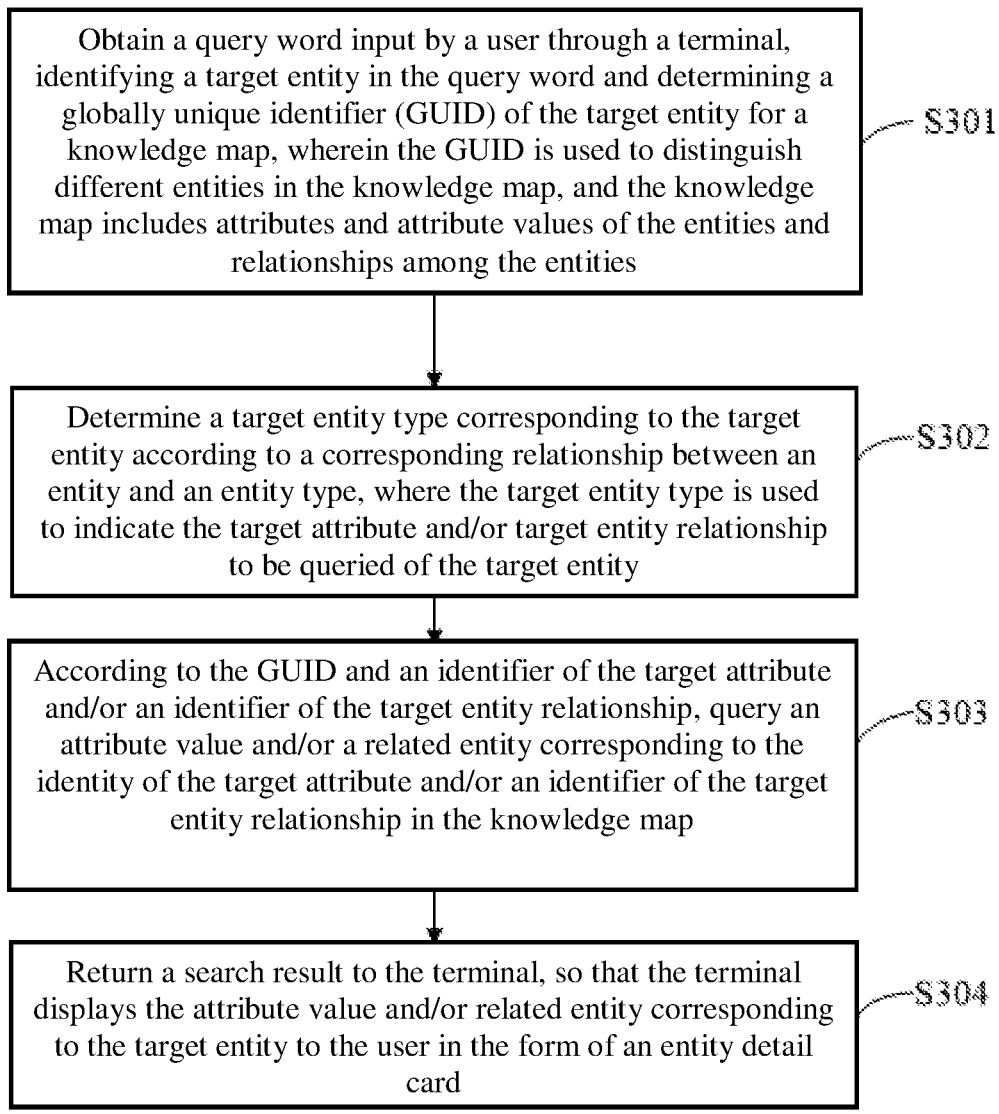
FIG. 3 is a schematic view of a flow chart of an information query method provided in an embodiment of the present invention.

FIG. 3 is a schematic view of a flow chart of an information query method provided in an embodiment of the present invention. In this exemplary embodiment, the implementation subject can be a server, which may be the server shown in FIG. 1 as described above. As shown in FIG. 3, the method includes:

S301, obtain a query word input by a user through a terminal, identifying a target entity in the query word and determining a globally unique identifier (GUID) of the target entity for a knowledge map, wherein the GUID is used to distinguish different entities in the knowledge map, and the knowledge map includes attributes and attribute values of the entities and relationships among the entities.

When a user needs to make a query for a query word, the user enters the query word on a browser, and the browser sends the query word to a server after obtaining the query word. After the server obtains the query word, the server identifies a target entity in the query word, and then obtains the Globally Unique Identifier (GUID) of the target entity. In this embodiment, each entity in the knowledge map uniquely corresponds to a GUID, and different entities in the knowledge map can be distinguished by means of the GUID.

S302, determine a target entity type corresponding to the target entity according to a corresponding relationship between an entity and an entity type, where the target entity type is used to indicate the target attribute and/or target entity relationship to be queried of the target entity.

Each entity corresponds to at least one entity type in the knowledge map, in which an entity type is the type to which the entity belongs. The entity type may indicate the corresponding attribute and/or entity relationship of an entity.

For example, taking the entity detail card of people as an example, the entity type to which the entity belongs may be a television director, an organization founder, a singer, a TV drama actor, a person, an associated person, and the like.

In the foregoing example, the attribute of the entity indicated by the television director may be a TV program or a movie; the attribute of the entity indicated by the founder of the organization may be the institution established; the attribute of the entity indicated by the singer may be a singing performance, or an album; the attribute of the entity indicated by the character. The entity relationship corresponding to the entity indicated by the person may be a date of birth, height, weight, or the like. The entity relationship of the entity indicated by the person can be a parent, a child, a spouse, or the like.

In this embodiment, after the target entity type corresponding to the target entity is determined, the target attribute and/or the target entity relationship to be queried of the target entity may be acquired according to the target entity type.

For example, the target entity is Qian Xuesen, the corresponding entity type is a person, an author, and for a person type, the target attribute to be queried may be the date of birth, height, weight, and the target entity relationship to be queried may be parents, child, spouse; In addition, for the entity type of an author, the target attribute to be queried can be a book.

A person skilled in the art can understand that the attribute indicated by the person type described above can be a universal attribute, that is, the person is not further distinguished. For some person, if some attribute thereof cannot be found in the knowledge map, the search result will not be feedback.

S303, according to the GUID and an identifier of the target attribute and/or an identifier of the target entity relationship, query an attribute value and/or a related entity corresponding to the identity of the target attribute and/or an identifier of the target entity relationship in the knowledge map.

In this embodiment, the GUID can be linked to an entity in the knowledge map so that all of the data of the entity can be obtained. When searching for the attribute value corresponding to the attribute of the entity and/or the related entity corresponding to the entity relationship of the entity, according to an identifier of the target attribute and/or an identifier of the target entity relationship, the attribute value corresponding to the identifier of the target attribute and the related entity corresponding to the identifier of the target entity relationship can be searched for from the data corresponding to the entity in the knowledge map according to the target attribute identifier and/or the identifier of the target entity relationship.

A person of ordinary skill in the art can understand that the knowledge map can be stored in the form of a database. In the database, all of the data of the entity can be linked through the GUID. According to the identifier of the target attribute and/or the identifier of the target entity relationship, the corresponding data can be found in the database.

S304, return a search result to the terminal, so that the terminal displays the attribute value and/or related entity corresponding to the target entity to the user in the form of an entity detail card.

After finding the search result in the knowledge map, the search result is returned to the terminal, and the terminal presents the search result to the user in the form of an entity detail card. For the process of the server returning a search result to the terminal, reference may be made to the embodiment shown in FIG. 1, and details will not be described again in this embodiment.

In the foregoing example, the entity detail card shows the attributes and the corresponding attribute values, in addition, the entity detail card may also display the entity relationship and the corresponding related attributes. Taking "Qian Xuesen" as an example, the date of birth (attribute): Dec. 11, 1911 (attribute value), for example: spouse (entity relationship): Jiang Ying (related entity).

In the information query method provided in this embodiment, after acquiring the query word, the target entity in the query word is identified, and a GUID of the target entity for the knowledge map is determined. In this embodiment, when obtaining a search result for the target entity, according to the entity type corresponding to the entity, this method determines the target entity type to which the target entity belongs. The target entity type is used to indicate a target attribute to be queried and/or a target entity relationship of the target entity, and then the knowledge the data to be queried is obtained according to the GUID and the attribute identifier and entity relationship identifier knowledge map, that is, according to different entities with different corresponding entity types, the displayed contents will be different. In this way, the search results are categorized clearly. In addition, since the search result is obtained based on the knowledge map, so that the content corresponding to the search result has a clear structure, is complete and accurate, thereby allowing users to quickly obtain the useful information.

In the following, a detailed embodiment is used to describe in detail the specific implementation manner of the information query method provided by the present invention.

Figure 4:
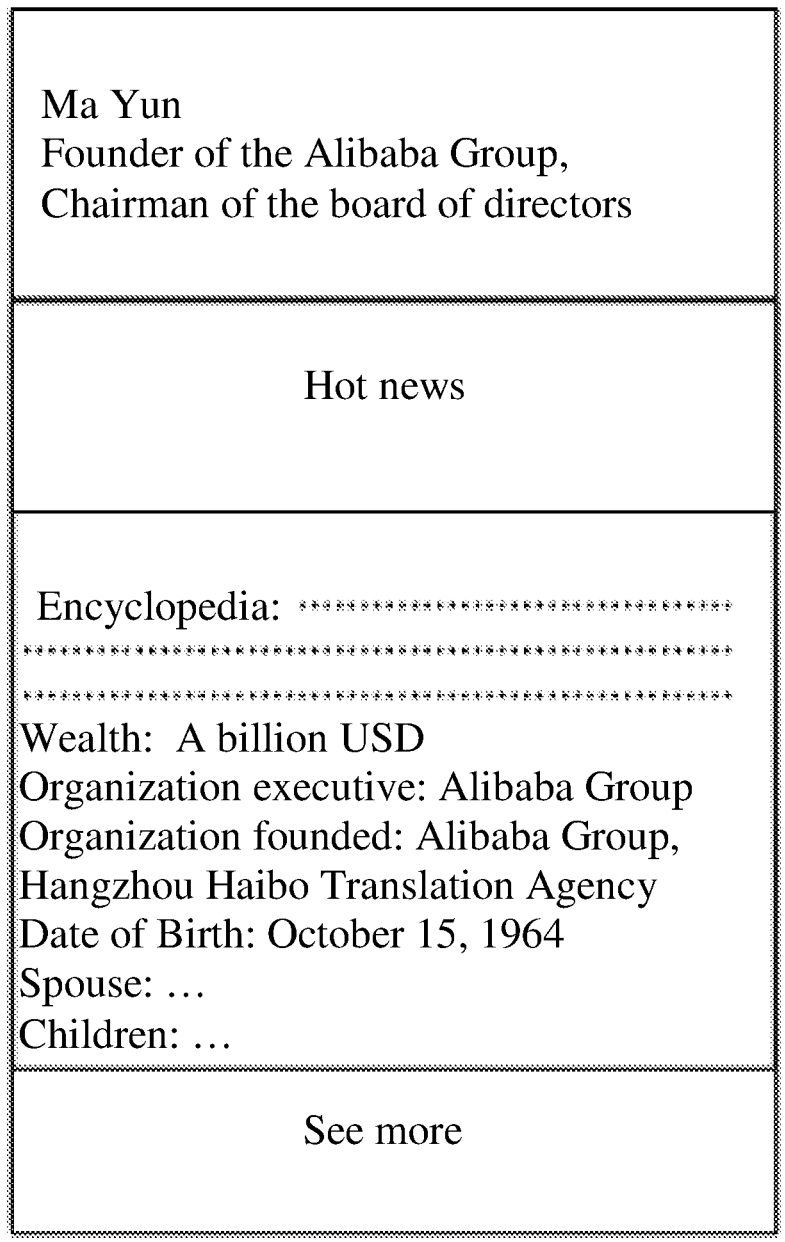
FIG. 4 is a schematic view of the structure of an entity detail card provided in an embodiment of the present invention.

FIG. 4 is a schematic view of the structure of an entity detail card provided in an embodiment of the present invention. In this embodiment, the display order corresponding to each attribute is further limited, so that a significant type of the entity can be displayed in a more visible position, and the user can directly and quickly obtain the important information.

Specifically, in this embodiment the entity type can be divided into a significant type and a non-significant type, in which the attributes indicated by a significant type refer to the apparent and attractive attributes of an entity. Different entities correspond to different entity types. Among these entity types, some are significant types and some are non-significant types. The significant type corresponding to the entity can be marked. When a server obtains the entity type of a target entity, the server can acquire both the significant type and the non-significant type at the same time.

In a specific example, for business people, the significant types include organization founder and organization executive officers. The attribute indicated by the founder of the organization is the organization that is created, and the attribute indicated by the organization's executive officers the managed organization. For the entertainers, the significant type may be a singer, and the singer's indicated attributes include albums, songs, and the like. The person is a non-significant attribute for business people, organization founders, and entertainers.

In order to enable a user to quickly obtain the significant type of an entity so as to understand the significant attribute of the entity, in this embodiment the priority of display order of a significant type of higher than the priority of display order of a non-significant type. That is, the position of the display order of the attribute value of the attribute and/or the related entity corresponding to the entity relationship indicated by an entity type of a higher priority in the entity detail card precedes the position of the display order of the attribute value of the attribute and/or the related entity corresponding to the entity relationship indicated by an entity type of a lower priority.

In this way, the server can return the search results to the terminal according to the priority of the display order corresponding to each entity type, so that in the entity detail card shown to the user, the position of display of the attribute value and/or the related entity corresponding to a significant type is before the position of display of the attribute value and/or the related entity corresponding to a non-significant type, so that the user can quickly obtain the significant type of the entity.

As shown in FIG. 4, using businessman Ma Yun as an example, the significant types are a rich person, an organization founder, and an organization executive. The non-significant type is a person. Among them, the attributes indicated by the significant types include wealth, an organization executive, founding an organization; whereas the attributes indicated by the non-significant types include date of birth, and the entity relationship corresponding to the non-significant type include spouse, children, and the like. As shown in FIG. 4, the display positions of the attributes such as wealth, an organization executive, founding an organization and the like are arranged before the display positions of the attribute of birth, and of the entity relationship such as spouse, children and so on. In this way, during the process of browsing the web page, a user can quickly obtain the significant type of the entity to be queried so as to learn the important information of the entity.

Optionally, in the present embodiment, as shown in FIG. 4, the head portion of the entity detail card is also provided with certain significant features of the entity. That is, Ma Yun's significant features are provided below the entity of Ma Yun: Founder of the Alibaba Group, Chairman of the Group's Board of Directors. A person of ordinary skill in the art can understand that each entity may correspond to a significant feature. The significant feature may be a feature stored in the database for an individual entity, or the significant feature may be an attribute of the entity in the knowledge map, and the corresponding attribute value can be searched according to such an attribute. By means of displaying the significant features of an entity in the head portion of the entity detail card, that is, the important information of the entity is extracted, a user is allowed to quickly understand the important content of the entity to be queried and establish a clear understanding of the entity.

Optionally, in this embodiment, in the content area shown in FIG. 4, a news guide and a link thereof corresponding to hot news are also provided. Specifically, after obtaining the query word, the server also obtains the hot news corresponding to the entity. Correspondingly, the search result includes the hot news. The hot news may be the news that is closest to the current time, the news that has a click-through rate that exceeds a preset value, or the news that is ahead of a preset number in a news ranking. The specific implementation of the hot news is not particularly limited in this embodiment. By setting hot news in the content area, a user is allowed to quickly understand the latest progress or status of the entity, and the like, so as to ensure the timeliness of the search result provided to the user.

Figure 5:
FIG. 5 is a schematic view of the structure of an entity detail card provided in an embodiment of the present invention.
Figure 5:
Figure 5:
Figure 5:

FIG. 5 is a schematic view of the structure of an entity detail card provided in an embodiment of the present invention.

In this embodiment, for each entity type, a preset quantity of entity information is provided in a non-deployed area within the content area. The entity information is an entity attribute and a corresponding attribute value, or an entity relationship and a corresponding related entity.

In this embodiment, in the case that there are many attributes and/or entity relationships corresponding to the entity, the entity information corresponding to each entity type is limited, so that the user can browse the information corresponding to a plurality of entity types in the non-deployed area within the content area, thus ensuring the breadth of knowledge acquired by the user.

For example, as shown in FIG. 5, the entity detail card for an artist Zhang San is shown, for the person type, not all of the entity information of the person type is shown in the card, rather only a portion of the entity information is displayed. In this case, when a user clicks the option of to view more, all of the person information will be displayed. Taking FIG. 5 as an example, on the basis of FIG. 5, for the person information, the attribute values corresponding to gender, founding organization, and ethnic attribute will also be displayed, as well as the related entity corresponding to the disciples thereof.

Figure 6:
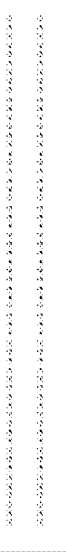
FIG. 6 is a schematic view of the structure of an entity detail card provided in an embodiment of the present invention.

FIG. 6 is a schematic view of the structure of an entity detail card provided in an embodiment of the present invention. In this embodiment, the entity type may also be divided into a basic entity type and an extended entity type. Correspondingly, in the embodiment shown in FIG. 3, the search result includes the attribute value of the attribute and/or the related entity corresponding to the entity relationship indicated by the basic entity type, and the extended entity type.

In this embodiment, the basic entity type is mainly used to describe the basic information of the entity. For example, as for the detail card of a person, the basic information includes personal information, associated people, and the like. The extended entity type is some entity-specific information, such as film and television works, musical works, and so on.

Since a user may have different requirements for different types of information of an entity, the search result returned to the user can include the attribute value of the attribute and/or the related entity corresponding to the entity relationship indicated by the basic entity type, as well as an extended entity type.

As shown in FIG. 6, the main interface of the entity detail card displays a homepage. The homepage displays personal information and an extended type tag corresponding to the extended entity type. The extended type tag may include an introduction for the person, a film and television work, and a musical work.

When a user clicks on the film and television work, the terminal obtains the click operation, sends a query request for the film or television work to the server, and the server responds to the user's operation on the extended type tag on the terminal according to the query request, and returns the attribute value of the attribute and/or the related entity corresponding to the entity relationship indicated by the entity type corresponding to the extended type tag, that is, returns the attribute value corresponding to the film or television work to the terminal. A person skilled in the art can understand that, after finding the information corresponding to the extended type tag, the server may perform caching. As a result, when a user clicks the extended type tag, the search result can be returned to the terminal, or after the user clicks the extended type tag, find the result in the knowledge map.

After returning the search result for the film or television work to the terminal, the terminal displays the attribute value and/or related entity corresponding to the extended type tag on the main interface of the entity detail card, that is, jumps to the webpage of the film or television work.

A person skilled in the art can understand that the above embodiments are not isolated from each other; rather these embodiments can learn from each other and derive other embodiments therefrom.

Figure 7:
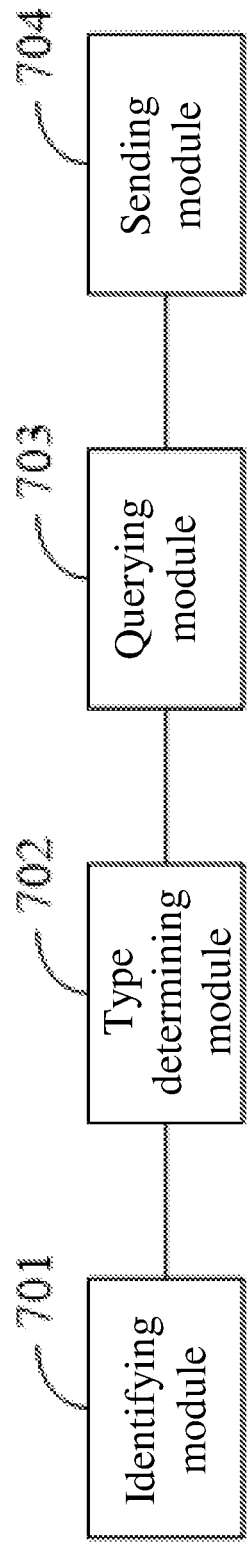
FIG. 7 is a schematic view of the structure of an information query apparatus provided in an embodiment of the present invention.

FIG. 7 is a schematic view of the structure of an information query apparatus provided in an embodiment of the present invention. The apparatus includes:

an identifying module 701, which is used for obtaining a query word input by a user through a terminal, identifying a target entity in the query word and determining a globally unique identifier (GUID) of the target entity for a knowledge map, where the GUID is used to distinguish different entities in the knowledge map, and the knowledge map includes attributes and attribute values of the entities and relationships among the entities;

a type determining module 702, which is used for determining a target entity type corresponding to the target entity according to a corresponding relationship between an entity and an entity type, wherein the target entity type is used to indicate the target attribute and/or target entity relationship to be queried of the target entity;

a querying module 703, which is used for querying an attribute value and/or a related entity corresponding to the identity of the target attribute and/or an identifier of the target entity relationship in the knowledge map according to the GUID and an identifier of the target attribute and/or an identifier of the target entity relationship;

a sending module 704, which is used for returning a search result to the terminal, so that the terminal displays the attribute value and/or related entity corresponding to the target entity to the user in the form of an entity detail card.

Optionally, the sending module 704 is specifically used for:

returning the search result to the terminal according to a priority of display order corresponding to each entity type;

where the entity type is divided into a significant type and a non-significant type, a display order of the significant type has a priority higher than a display order of the non-significant type, the position of the display order of the attribute value of the attribute and/or the related entity corresponding to the entity relationship indicated by an entity type of a higher priority in the entity detail card precedes the position of the display order of the attribute value of the attribute and/or the related entity corresponding to the entity relationship indicated by an entity type of a lower priority.

Optionally, the entity type is divided into a basic entity type and an extended entity type, the search result comprises the attribute value of the attribute and/or the related entity corresponding to the entity relationship indicated by a basic entity type, and an extended entity type; and a main interface of the entity detail card displays the attribute value of the attribute and/or the related entity corresponding to the entity relationship indicated by the basic entity type and an extended type tag;

the sending module 704 is further used for:

in response to an operation on the extended type tag made by the user on the terminal, returning to the terminal the attribute value of the attribute and/or the related entity corresponding to entity relationship indicated by the entity type corresponding to the extended type tag, so that the terminal displays the attribute value and/or related entity corresponding to the extended type tag on the main interface of the entity detail card.

Optionally, the entity detail card includes a head portion, a content area, and a trail portion;

the head portion is provided with an entity name corresponding to the entity and a significant feature of the entity;

the content area is provided with the attribute value of the attribute and/or the related entity corresponding to the entity relationship indicated by the entity type; and the tail portion is provided with a deployment option.

Optionally, the querying module 703 is further used for obtaining hot news corresponding to the entity, and the search result further comprises the hot news;

the content area is further provided with a news guide and a news link corresponding to the hot news.

Optionally, a preset number of entity information is set for each entity type in a non-deployed area in the content area, wherein the entity information is specifically an attribute of the entity and a corresponding attribute value, or an entity relationship and a corresponding related entity.

Optionally, the entity belongs to one of the following fields:

a field of people, a field of medicine, a field of book, a field of food, a food of plant, a field of real estate, a field of education and a field of entertainment.

The apparatus provided in this embodiment may perform the foregoing technical solution of the method embodiment. The implementation principle and technical effect thereof are similar, and will not be described again in this embodiment.

A person of ordinary skill in the art can understand that all or part of the steps for implementing the above method embodiments can be accomplished through the program instructions for related hardware. The aforementioned program may be stored in a computer readable storage medium. When the program is executed, the steps of the foregoing method embodiments are performed. The foregoing storage medium includes various media that can store program codes, such as a ROM, a RAM, a magnetic disk, or an optical disk.

Finally, it should be noted that the above embodiments are only used to describe the technical solutions of the present invention, rather than limit the technical solutions of the present invention; although the present invention has been described in detail with reference to the foregoing embodiments, a person skilled in the art should understand that it is still possible to modify the technical solutions described in the foregoing embodiments or equivalently replace some or all of the technical features thereof; and these modifications or replacements do not deviate the essence of the corresponding technical solutions from the scope of the technical solutions of the embodiments of the present invention.

What is claimed is:

1. An information query method, comprising:
    obtaining a query word input by a user through a terminal, identifying a target entity in the query word input and determining a globally unique identifier (GUID) of the target entity for a knowledge map, wherein:
        the knowledge map comprises a plurality of nodes and a plurality of edges connecting the plurality of nodes,
        the plurality of nodes represent a plurality of entities, and
        each of the plurality of entities is associated with a corresponding GUID and a corresponding entity type;
    determining a plurality of target entity types corresponding to the target entity according to a corresponding relationship between an entity and an entity type, wherein each of the plurality of target entity types defines a plurality of target attributes and/or a plurality of target entity relationships to be queried of the target entity;
    according to the GUID and an identifier of a target attribute from the plurality of target attributes and/or an identifier of a target entity relationship from a plurality of target relationships, querying an attribute value and/or a related entity corresponding to the identifier of the target attribute and/or the identifier of the target entity relationship in the knowledge map; and
    returning a search result to the terminal, so that the terminal displays the attribute value and/or the related entity corresponding to the target entity to the user in an entity detail card.

2. The information query method according to claim 1, wherein returning the search result to the terminal comprises:
    returning the search result to the terminal according to a priority of display order corresponding to each entity type;
    wherein the entity type is divided into a significant type and a non-significant type, wherein a display order of the significant type has a priority higher than a display order of the non-significant type, and
    wherein, in a rendering of the entity detail card, a position of the display order of a first attribute value of a first attribute defined by the significant type precedes a position of the display order of a second attribute value of a second attribute defined by the non-significant type.

3. The information query method of claim 2, wherein, in the rendering of the entity detail card, a position of the display order of a first related entity corresponding to a first entity relationship defined by the significant type precedes a position of the display order of a second related entity corresponding to a second entity relationship defined by the non-significant type.

4. The information query method according to claim 1, wherein the entity type is divided into a basic entity type and an extended entity type, the search result comprises the attribute value of the attribute and/or the related entity corresponding to entity relationship indicated by the basic entity type and the extended entity type; and wherein a main interface of the entity detail card displays the attribute value of the attribute and/or the related entity corresponding to the entity relationship indicated by the basic entity type and an extended type tag;

the information query method further comprising:
in response to an operation on the extended type tag made by the user on the terminal, returning to the terminal the attribute value of the attribute and/or the related entity corresponding to the entity relationship indicated by the entity type corresponding to the extended type tag, so that the terminal displays the attribute value and/or the related entity corresponding to the extended type tag on the main interface of the entity detail card.

5. The information query method according to claim 2, wherein the entity detail card comprises a head portion, a content area, and a tail portion; wherein the head portion is provided with an entity name corresponding to the entity and a significant feature of the entity; wherein the content area is provided with the attribute value of the attribute and/or the related entity corresponding to entity relationship indicated by the entity type; and wherein the tail portion is provided with a deployment option.

6. The information query method according to claim 5, further comprising:
obtaining hot news corresponding to the entity, and the search result further comprises the hot news;
wherein the content area comprises a news guide and a news link corresponding to the hot news.

7. The information query method according to claim 5, wherein a preset number of entity information is set for each entity type in a non-deployed area in the content area, and wherein the entity information comprises an attribute of the entity and a corresponding attribute value or an entity relationship and a corresponding related entity.

8. The information query method according to claim 1, wherein the entity belongs to one of the following fields:
a field of people, a field of medicine, a field of book, a field of food, a food of plant, a field of real estate, a field of education, and a field of entertainment.

9. The information query method of claim 1, wherein each of the plurality of edges represents an attribute or a relationship associated with two of the plurality of nodes.

10. A non-transitory computer readable storage medium comprising program instructions stored therein, wherein the program instructions are configured to, when executed, cause a computer to:
obtain a query word input by a user through a terminal, identifying a target entity in the query word input, and determining a globally unique identifier (GUID) of the target entity for a knowledge map, wherein:
the knowledge map comprises a plurality of nodes and a plurality of edges connecting the plurality of nodes, the plurality of nodes represent a plurality of entities, and
each of the plurality of entities is associated with a corresponding GUID and a corresponding entity type;

determine a plurality of target entity types corresponding to the target entity according to a corresponding relationship between an entity and an entity type, wherein each of the plurality of target entity types defines a plurality of target attributes and/or a plurality of target entity relationships to be queried of the target entity;
query an attribute value and/or a related entity corresponding to an identifier of a target attribute from the plurality of target attributes and/or an identifier of a target entity relationship in the knowledge map from a plurality of target relationships according to the GUID and the identifier of the target attribute and/or the identifier of the target entity relationship; and
return a search result to the terminal, so that the terminal displays the attribute value and/or the related entity corresponding to the target entity to the user in an entity detail card.

11. The non-transitory computer readable storage medium according to claim 10, wherein the program instructions are configured to, when executed, cause the computer to return the search result to the terminal according to a priority of display order corresponding to each entity type;
wherein the entity type is divided into a significant type and a non-significant type, wherein a display order of the significant type has a priority higher than a display order of the non-significant type, and
wherein, in a rendering of the entity detail card, a position of the display order of a first attribute value of a first attribute defined by the significant type precedes a position of the display order of a second attribute value of a second attribute defined by the non-significant type.

12. The non-transitory computer readable storage medium of claim 11, wherein, in the rendering of the entity detail card, a position of the display order of a first related entity corresponding to a first entity relationship defined by the significant type precedes a position of the display order of a second related entity corresponding to a second entity relationship defined by the non-significant type.

13. The non-transitory computer readable storage medium according to claim 10, wherein the entity type is divided into a basic entity type and an extended entity type, the search result comprises the attribute value of the attribute and/or the related entity corresponding to entity relationship indicated by the basic entity type and the extended entity type; and wherein a main interface of the entity detail card displays the attribute value of the attribute and/or the related entity corresponding to the entity relationship indicated by the basic entity type and an extended type tag;
wherein the program instructions are configured to, when executed, cause the computer to:
in response to an operation on the extended type tag made by the user on the terminal, return to the terminal the attribute value of the attribute and/or the related entity corresponding to entity relationship indicated by the entity type corresponding to the extended type tag, so that the terminal displays the attribute value and/or the related entity corresponding to the extended type tag on the main interface of the entity detail card.

14. The non-transitory computer readable storage medium according to claim 11, wherein the entity detail card comprises a head portion, a content area, and a tail portion; wherein the head portion is provided with an entity name corresponding to the entity and a significant feature of the entity; wherein the content area is provided with the attribute value of the attribute and/or the related entity corresponding to entity relationship indicated by the entity type; and wherein the tail portion is provided with a deployment option.

15. The non-transitory computer readable storage medium according to claim 14, wherein the program instructions are configured to, when executed, cause the computer to obtain hot news corresponding to the entity, and the search result further comprises the hot news;
   wherein the content area further comprises a news guide and a news link corresponding to the hot news.

16. The non-transitory computer readable storage medium according to claim 14, wherein a preset number of entity information is set for each entity type in a non-deployed area in the content area, and wherein the entity information comprises an attribute of the entity and a corresponding attribute value or an entity relationship and a corresponding related entity.

17. The non-transitory computer readable storage medium according to claim 10, wherein the entity belongs to one of the following fields:
   a field of people, a field of medicine, a field of book, a field of food, a food of plant, a field of real estate, a field of education, and a field of entertainment.

18. The non-transitory computer readable storage medium of claim 10, wherein each of the plurality of edges represents an attribute or a relationship associated with two of the plurality of nodes.

\* \* \* \* \*